US009494766B2

(12) United States Patent
Iwane

(10) Patent No.: US 9,494,766 B2
(45) Date of Patent: Nov. 15, 2016

(54) IMAGE-CAPTURING DEVICE

(71) Applicant: NIKON CORPORATION, Tokyo (JP)

(72) Inventor: Toru Iwane, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/575,164

(22) Filed: Dec. 18, 2014

(65) Prior Publication Data

US 2015/0103228 A1 Apr. 16, 2015

Related U.S. Application Data

(63) Continuation of application No. 13/474,189, filed on May 17, 2012, now Pat. No. 8,941,771, which is a continuation of application No. PCT/JP2011/062828, filed on Jun. 3, 2011.

(60) Provisional application No. 61/487,427, filed on May 18, 2011.

(30) Foreign Application Priority Data

Jun. 3, 2010 (JP) .................................. 2010-127825

(51) Int. Cl.
*G06K 9/34* (2006.01)
*G02B 27/00* (2006.01)
(Continued)

(52) U.S. Cl.
CPC ............... *G02B 9/00* (2013.01); *G02B 3/0056* (2013.01); *G02B 27/0075* (2013.01); *G06T 1/0007* (2013.01)

(58) Field of Classification Search
CPC ...... H04N 5/228; H04N 5/225; H04N 5/232; H01L 27/00; G03B 7/099; G02B 27/10; G02B 9/00; G02B 27/0075; G02B 3/0056; G06K 9/34; G06T 1/0007
USPC ..................... 348/340, 222.1, 345, 373, 349; 250/208.1; 359/619, 368; 396/113, 396/428, 333; 382/164, 171, 173, 284; 296/113, 333, 428
See application file for complete search history.

(56) References Cited

U.S. PATENT DOCUMENTS 7,728,902 B2 * 6/2010 Kishigami et al. ........... 348/340
8,941,771 B2 * 1/2015 Iwane ........................... 348/340
(Continued)

FOREIGN PATENT DOCUMENTS

| JP | A 2007-004471 | 1/2007 |
| JP | A 2010-113554 | 5/2010 |
| JP | A 2010-114758 | 5/2010 |

OTHER PUBLICATIONS

Ng et al; "Light Field Photography with a Hand-held Plenoptic Camera;" Stanford Tech Report CTSR; Feb. 2005; pp. 1-11.
(Continued)

*Primary Examiner* — Tuan Ho
*Assistant Examiner* — Marly Camargo
(74) *Attorney, Agent, or Firm* — Oliff PLC

(57) ABSTRACT

An image-capturing device includes: a plurality of micro-lenses disposed in a two-dimensional pattern near a focal plane of an image forming optical system; an image sensor that includes a two-dimensional array of element groups each corresponding to one of the micro-lenses and made up with a plurality of photoelectric conversion elements which receive, via the micro-lenses light fluxes from a subject having passed through the photographic optical system and output image signals; and a synthesizing unit that combines the image signals output from the plurality of photoelectric conversion elements based upon information so as to generate synthetic image data in correspondence to a plurality of image forming areas present on a given image forming plane of the image forming optical system, the information specifying positions of the photoelectric conversion elements output image signals that are to be used for generating synthetic image data for each image forming area.

13 Claims, 14 Drawing Sheets

(51) Int. Cl.
   *G02B 3/00* (2006.01)
   *H04N 5/225* (2006.01)
   *G02B 9/00* (2006.01)
   *G06T 1/00* (2006.01)

(56) References Cited

U.S. PATENT DOCUMENTS

2007/0252047 A1  11/2007  Pal
2008/0031497 A1  2/2008   Kishigami et al.
2009/0140131 A1* 6/2009   Utagawa .................. 250/226

OTHER PUBLICATIONS

Aug. 16, 2011 Search Report issued in International Patent Application No. PCT/JP2011/062828.
May 20, 2014 Office Action issued in Japanese Patent Application No. 2010-127825 (with translation).
Feb. 27, 2015 Office Action issued in Chinese Application No. 2011800167729.
May 17, 2016 Office Action issued in Japanese Patent Application No. 2014-262947.

* cited by examiner

IMAGE-CAPTURING DEVICE

This is a Continuation of application Ser. No. 13/474,189 filed May 17, 2012, which in turn is a continuation of International Application No. PCT/JP2011/062828 filed Jun. 3, 2011, which claims the benefit of U.S. Provisional Application No. 61/487,427 filed May 18, 2011. This application also claims priority from Japanese Application No. 2010-127825 filed Jun. 3, 2010. The disclosure of the prior applications is hereby incorporated by reference herein in its entirety.

BACKGROUND

1. Field of the Invention

The present invention relates to an image-capturing device capable of generating a synthetic image.

2. Description of Related Art

Japanese Laid Open Patent Publication No. 2007-4471, US 2007/0252047 and "Light Field Photography With a Handheld Plenoptic Camera, Stanford Tech Report CTSR 2005-02" disclose image-capturing devices known in the related art that are equipped with a plurality of image-capturing pixels disposed in correspondence to each micro-lens, and are capable of generating an image assuming any desired focus position following a photographing operation by combining image data having been obtained through the single photographing operation.

SUMMARY OF THE INVENTION

There is an issue to be addressed with regard to such image-capturing devices in the related art in that the image generated as described above assumes a resolution matching the number of micro-lenses disposed in the array, which is bound to be much lower than the density with which the image-capturing pixels are arrayed. In addition, the arithmetic processing required to generate the synthetic image is bound to be extremely complex.

According to the 1st aspect of the present invention, an image-capturing device comprises: a plurality of micro-lenses disposed in a two-dimensional pattern near a focal plane of an image forming optical system; an image sensor that includes a two-dimensional array of element groups each corresponding to one of the micro-lenses and made up with a plurality of photoelectric conversion elements which receive, via the micro-lenses light fluxes from a subject having passed through the photographic optical system and output image signals; and a synthesizing unit that combines the image signals output from the plurality of photoelectric conversion elements based upon information so as to generate synthetic image data in correspondence to a plurality of image forming areas present on a given image forming plane of the image forming optical system, the information specifying positions of the photoelectric conversion elements output image signals that are to be used for generating synthetic image data for each image forming area.

According to the 2nd aspect of the present invention, it is preferred that in the image-capturing device according to the 1st aspect, the plurality of image forming areas are set in a quantity equal to or greater than a quantity of micro-lenses and an array pitch with which the individual image forming areas are set has a proportional relation to an array pitch with which the plurality of micro-lenses are disposed.

According to the 3rd aspect of the present invention, it is preferred that in the image-capturing device according to the 1st aspect, the information specifying positions of the photoelectric conversion elements output image signals that are to be used to generate synthetic image data in each of the image forming areas is configured to a table determining specific positions of the photoelectric conversion elements that output the image signals to be used for generating synthetic image data for each image forming area According to the 4th aspect of the present invention, the image-capturing device according to the 3rd aspect may further comprise a creation unit that creates the table for each given image forming plane.

According to the 5th aspect of the present invention, it is preferred that in the image-capturing device according to the 3rd aspect, the table standardizes the positions assumed by the photoelectric conversion elements corresponding to each image forming area in reference to a pseudo-optical axis of the micro-lenses and specifies relative positions of the micro-lenses corresponding to the positions assumed by the photoelectric conversion elements in reference to the micro-lens corresponding to the image forming area.

According to the 6th aspect of the present invention, it is preferred that in the image-capturing device according to the 3rd aspect, the table determines the specific positions of the photoelectric conversion elements, each in correspondence to a specific micro-lens among the plurality of micro-lenses, to which the position assumed by a photoelectric conversion element among the photoelectric conversion elements present in an area assuming a diameter represented by a value obtained by dividing a focal length of the micro-lenses by a synthetic image data aperture number in reference to the image forming area, corresponds.

According to the 7th aspect of the present invention, it is preferred that in the image-capturing device according to the 1st aspect, the plurality of micro-lenses each assume a hexagonal shape on a plane ranging perpendicular to an optical axis of the photographic optical system and are disposed in a two-dimensional honeycomb array.

According to the 8th aspect of the present invention, the image-capturing device according to the 7th aspect may further comprise a converting unit that converts a ratio of a horizontal pitch and a vertical pitch of the synthetic image data generated by the synthesizing means, to 1.

According to the present invention, a table indicating the positions of specific photoelectric conversion elements, image signals from which are to be used to generate synthetic image data corresponding to one image forming area among a plurality of image forming areas on each image forming plane, is created and synthetic image data are generated based upon the table thus generated. As a result, synthetic image data with high resolution can be generated quickly.

DESCRIPTION OF PREFERRED EMBODIMENT

The digital camera achieved in an embodiment of the present invention is capable of generating image data assuming a field depth and a focus position desired by the user through numerical processing executed by utilizing wavefront information such as depth information included in image signals obtained as an image is photographed via a micro-lens array. An incident subject light flux, having passed through a photographic lens forms an image near the micro-lens array. The position at which the image is formed with the light flux in this manner varies along the optical axis of the photographic lens depending upon the position of the subject. In addition, subject light fluxes from a three-dimensional subject do not form images on a single plane. The digital camera achieved in the embodiment generates an image that is a replication of a subject image formed at a specific image forming position desired by the user, assumed along the optical axis.

In addition, the digital camera in the embodiment adopts such a structure that the image it generates is a synthetic image with a higher resolution than that matching the quantity of micro-lenses disposed in the micro-lens array. Namely, a plurality of image-capturing pixels (cardinal-point pixels), which output image signals to be used for generation of individual picture elements constituting the synthetic image, are disposed in correspondence to each micro-lens. The digital camera creates a synthetic image with an adjustable focus position so as to provide a synthetic image assuming a focus position selected by the user, by adding image signals output from image-capturing pixels, disposed near a cardinal-point pixel, to the image signal output from the cardinal-point pixel thereby generating a synthetic image signal corresponding to an image forming area equivalent to a single pixel in the synthetic image. The following is a detailed description of the embodiment.

Figure 1:
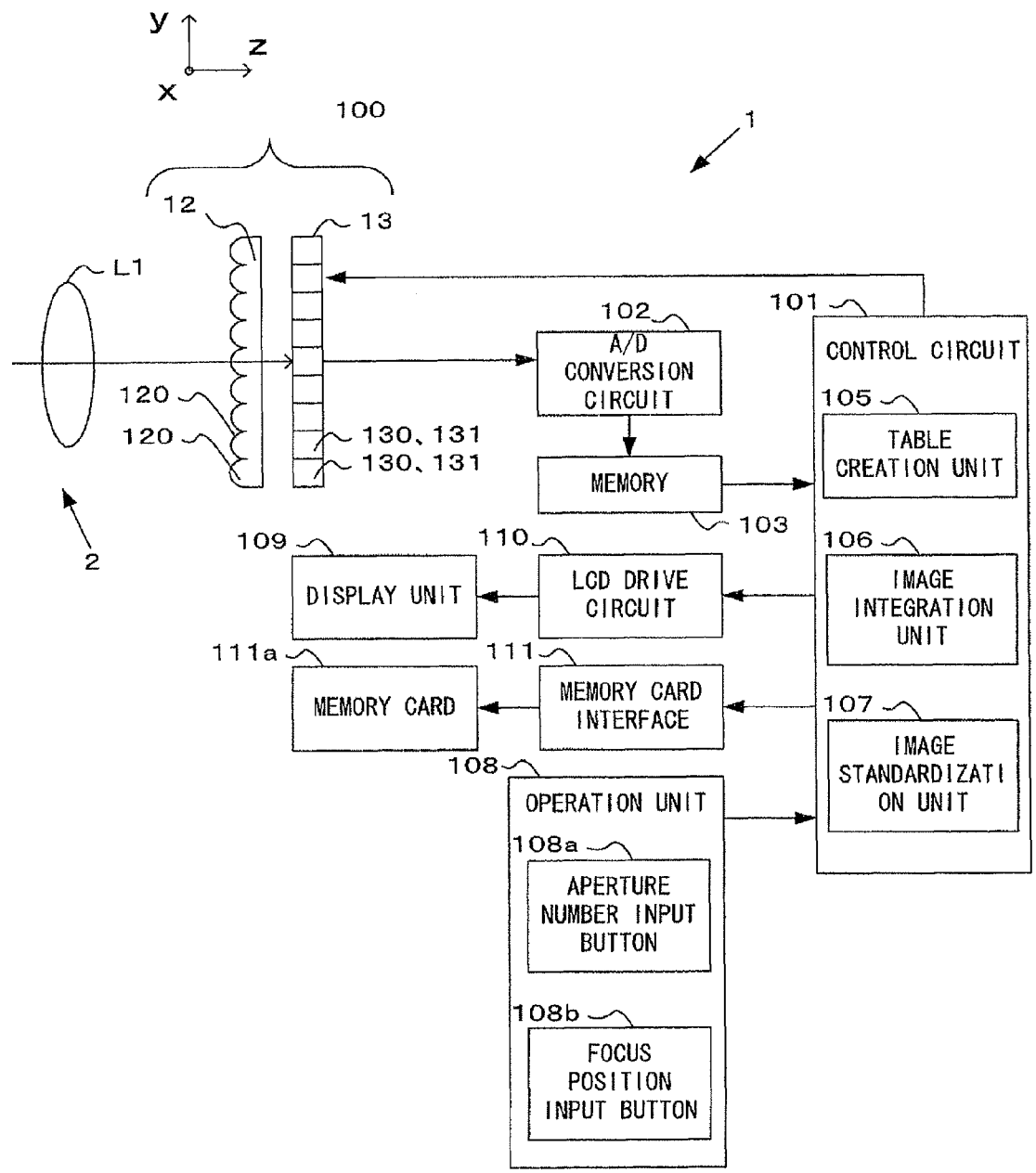
FIG. 1 is a block diagram showing the structure adopted in the digital camera achieved in an embodiment of the present invention.

FIG. 1 shows the structure adopted in the digital camera achieved in the embodiment. The digital camera 1 allows an exchangeable lens 2, which includes a photographic lens L1, to be detachably mounted thereat. The digital camera 1 includes an image-capturing unit 100, a control circuit 101, an A/D conversion circuit 102, a memory 103, an operation unit 108, a display unit 109, an LCD drive circuit 110 and a memory card interface 111. The image-capturing unit 100 includes a micro-lens array 12 achieved by disposing numerous micro-lenses 120 in a two-dimensional array, and an image sensor 13. It is to be noted that the following description is given by assuming that a z-axis extends parallel to the optical axis of the photographic lens L1 and that an x-axis and a y-axis extend perpendicular to each other within a plane ranging perpendicular to the z-axis.

An image is formed with a light flux traveling from a subject at a position near the focal plane of the photographic lens L1, constituted with a plurality of optical lens groups. It is to be noted that FIG. 1 shows the photographic lens L1 as a single representative lens for purposes of simplification. The micro-lens array 12 and the image sensor 13 are disposed in this order in the vicinity of the focal plane of the photographic lens L1. The image sensor 13 is constituted with a CCD image sensor or a CMOS image sensor, equipped with a plurality of photoelectric conversion elements. The image sensor 13 captures a subject image formed on its image-capturing surface and outputs photoelectric conversion signals (image signals) that correspond to the subject image, to the A/D conversion circuit 102 under control executed by the control circuit 101. It is to be noted that the image-capturing unit 100 will be described in detail later.

The A/D conversion circuit 102 executes analog processing on the image signals output by the image sensor 13 and then converts the analog image signals to digital image signals. The control circuit 101 is constituted with a CPU, a memory and other peripheral circuits. Based upon a control program, the control circuit 101 executes specific arithmetic operations by using signals input thereto from various units constituting the digital camera 1 and then outputs control signals for the individual units in the digital camera 1 so as to control photographing operations. In addition, based upon an operation signal input thereto via the operation unit 108 in response to an operation of an aperture number input button 108 a, the control circuit 101 sets a synthetic image aperture number having been selected by the user, as described in further detail later. The control circuit 101 further determines a synthetic image focus position based upon an operation signal input thereto via the operation unit 108 in response to an operation of a focus position input button 108 b, as described in further detail later.

The control circuit 101 has functions fulfilled by a table creation unit 105, an image integration unit 106 and an image standardization unit 107. The table creation unit 105 creates a synthesis affiliated pixel table based upon the synthetic image aperture number, which is determined in response to the operation of the aperture number input button 108 a. The image integration unit 105 generates synthetic image data by using the image signals based upon the synthetic image focus position, determined in response to the operation of the focus position input button 108 b, and in reference to the synthesis affiliated pixel table created by the table creation unit 105. The image standardization unit 107 corrects the synthetic image corresponding to the synthetic image data having been generated by the image integration unit 107 so as to achieve an aspect ratio (the ratio of width to height) of 1:1 for the synthetic image, as described later. It is to be noted that the table creation unit 105, the image integration unit 106 and the image standardization unit 107 will all be described in detail later.

The memory 103 is a volatile storage medium used to temporarily store the image signals having been digitized via the A/D conversion circuit 102, data currently undergoing image processing, image compression processing or display image data creation processing, and data resulting from the image processing, the image compression processing or the display image data creation processing. At the memory card interface 111, a memory card 111 *a* can be detachably loaded. The memory card interface 111 is an interface circuit that writes image data into the memory card 111 *a* and reads out image data recorded in the memory card 111 *a* as controlled by the control circuit 101. The memory card 111 *a* is a semiconductor memory card such as a compact flash (registered trademark) or an SD card.

The LCD drive circuit 110 drives the display unit 109 as instructed by the control circuit 101. At the display unit 109, which may be, for instance, a liquid crystal display unit, display data created by the control circuit 101 based upon image data recorded in the memory card 111 *a* are displayed in a reproduction mode. In addition, a menu screen that allows various operation settings to be selected for the digital camera 1 is brought up on display at the display unit 109.

Upon sensing a user operation performed thereat, the operation unit 108 outputs a specific operation signal corresponding to the user operation to the control circuit 101. The operation unit 108 includes the aperture number input button 108 *a*, the focus position input button 108 *b*, a power button, a shutter release button, buttons related to setting menus, such as a setting menu display changeover button and a setting menu OK button and the like. The user, wishing to enter a specific synthetic image aperture number F, operates the aperture number input button 108 *a*. As the user operates the aperture number input button 108 *a* and a specific aperture number F is thus selected, the operation unit 108 outputs a corresponding operation signal to the control circuit 101. The user, wishing to enter a specific synthetic image focus position y, operates the focus position input button 108 *b*. As the user operates the focus position input button 108 *b* and a specific focus position y is thus selected, the operation unit 108 outputs a corresponding operation signal to the control circuit 101.

Next, the structure of the image-capturing unit 100 is described in detail. As explained earlier, the image-capturing unit 100 comprises the micro-lens array 12 and the image sensor 13. The micro-lens array 12 is constituted with a plurality of micro-lenses 120 disposed in a two-dimensional pattern. At the image sensor 13, pixel clusters 130, each of which receives light having passed through a specific micro-lens among the micro-lenses 120 mentioned above, are disposed with an array pattern corresponding to the array pattern of the micro-lenses 120. Each pixel cluster 130 is made up with a plurality of photoelectric conversion elements 131 (hereafter referred to as image-capturing pixels 131) disposed in a two-dimensional pattern.

Figure 2A:
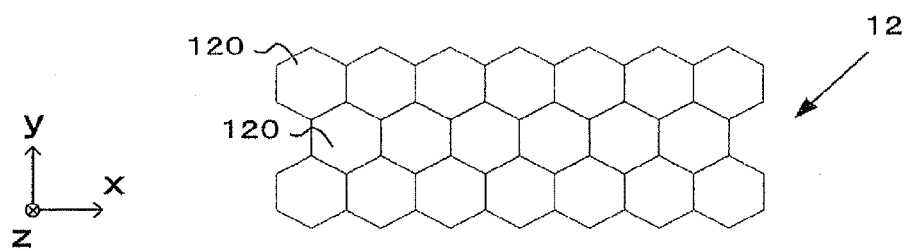
FIGS. 2A and 2B are an example of a positional arrangement that may be assumed for the micro-lenses and the image sensor, with FIG. 2A presenting a plan view taken over the XY plane and FIG. 2B representing the positional relationship along the optical axis (along the z-axis) of the photographic lens.
Figure 2B:
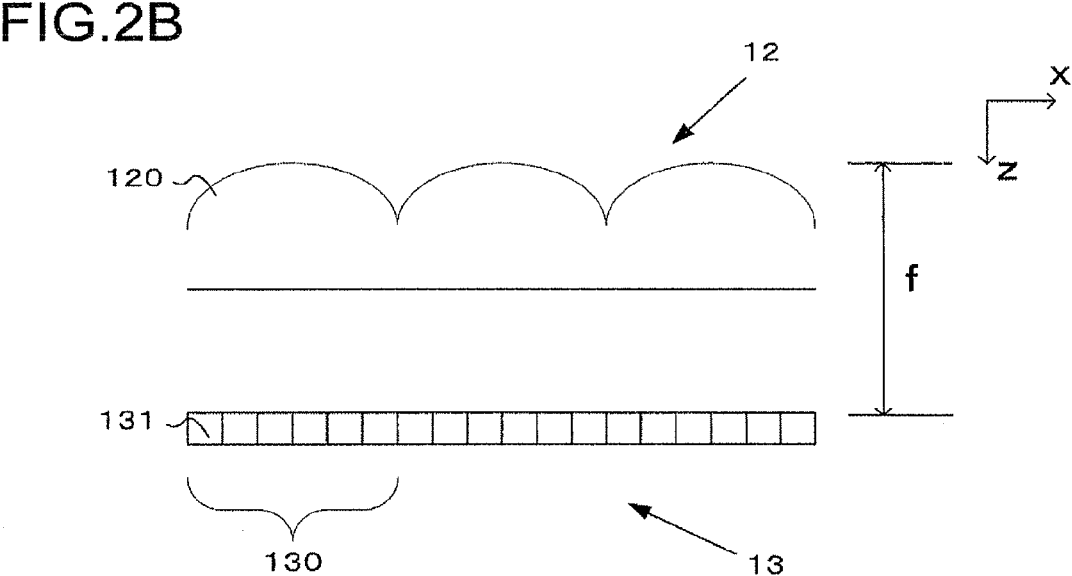

FIG. 2A is a plan view, taken over the xy plane, of the micro-lenses 120 disposed in the micro-lens array 12. As shown in FIG. 2A, a plurality of micro-lenses 120, each assuming a hexagonal shape, are disposed in a honeycomb pattern on the xy plane. It is to be noted that FIG. 2A only shows some of the micro-lenses 120 among the plurality of micro-lenses 120 disposed at the micro-lens array 12. FIG. 2B illustrates the positional relationship among the photographic lens L1, the micro-lens array 12 and the image sensor 13, assumed along the optical axis (along the z-axis) of the photographic lens L1. As shown in FIG. 2B, the image sensor 13 is disposed at a position set apart by a focal length f of the micro-lenses 120. In other words, each pixel cluster 130 made up with a plurality of image-capturing pixels 131 assumes a position set apart from the corresponding micro-lens 120 by the focal length f of the micro-lens 120. It is to be noted that FIG. 2B shows only some of the plurality of micro-lenses 120 disposed at the micro-lens array 12 and only some of the plurality of pixel clusters 130 and the plurality of image-capturing pixels 131 disposed at the image sensor 13.

The image integration unit 106 creates synthetic image data by using image signals output from the image sensor 13 structured as described above. The image integration unit 106 combines an image signal (hereafter referred to as a cardinal-point signal) output from a specific image-capturing pixel 131 (hereafter referred to as a cardinal-point pixel 132 (see FIG. 3)) among the image-capturing pixels 131 making up the pixel cluster 130 disposed in correspondence to a given micro-lens 120, with image signals output from image-capturing pixels 131 included in the pixel cluster 130 disposed for the micro-lens 120 corresponding to the cardinal-point pixel 132 and pixel clusters 130 corresponding to micro-lenses 120 disposed nearby. The image integration unit 106 generates synthetic image signal equivalent to a single picture element through this process. The image integration unit 106 executes the processing described above for all the cardinal-point pixels corresponding to each micro-lens 120 and generates synthetic image data by adding together the individual synthetic image signals thus generated.

The image integration unit 106 generates the synthetic image signals as described above, by referencing the synthesis affiliated pixel table created by the table creation unit 105. The synthesis affiliated pixel table indicates the position at which each image-capturing pixel 131 among the image-capturing pixels that output image signals to be combined with the cardinal-point signal, is disposed in a pixel cluster 130 corresponding to a specific micro-lens 120. The processing executed by the image integration unit 106 to generate synthetic image signals by using image signals output from the image-capturing pixels 131 and the processing executed by the table creation unit 105 to create the synthesis affiliated pixel table are now described.

Figure 3:
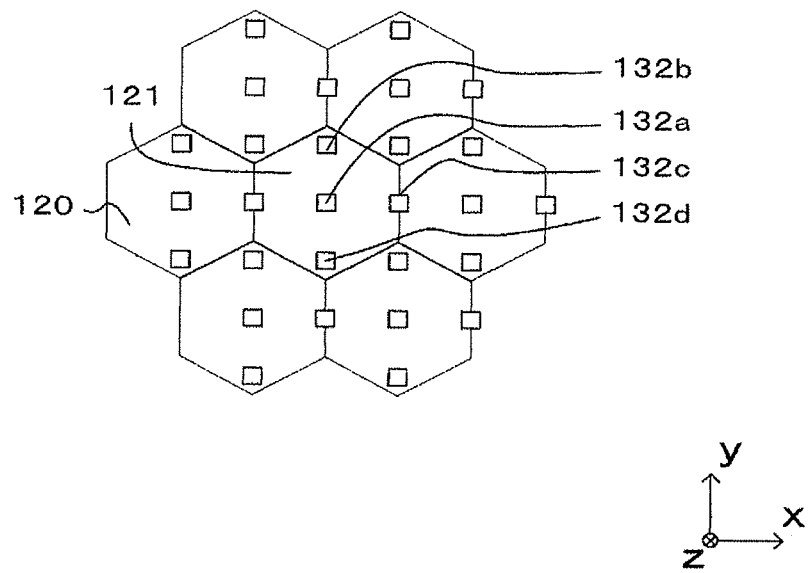
FIG. 3 illustrates the positional relationship between a micro lens and the corresponding cardinal point pixel assumed in the embodiment.

FIG. 3 shows cardinal-point pixels disposed in correspondence to each micro-lens 120, i.e., disposed in each pixel cluster 130. FIG. 3, too, shows only some micro-lenses 120 among the plurality of micro-lenses 120. As FIG. 3 indicates, four cardinal-point pixels 132 *a* to 132 *d* are disposed in correspondence to each micro-lens 120 in the embodiment. By providing a plurality of cardinal-point pixels 132 in correspondence to each micro-lens, the area where the focus position cannot be adjusted can be reduced. Namely, while the size of the area where the focus position cannot be adjusted is ±2f (f represents the focal length of the micro-lens 120) when the pixel cluster includes a single cardinal-point pixel 132, the area can be reduced to ±f at the smallest by providing a plurality of cardinal-point pixels 132. Furthermore, by disposing a greater quantity of cardinal-point pixels 132, the number of pixels constituting the synthetic image data can be increased. In the example presented in FIG. 3, the number of pixels constituting the synthetic image data is four times the number of micro-lenses 120 disposed at the micro-lens array 12.

In FIG. 3, the cardinal-point pixel 132 a is disposed in correspondence to a pseudo-optical axis of the micro-lens 120. It is to be noted that the embodiment is described by assuming that the term "pseudo-optical axis" refers to the point at which the center of a light flux entering from the pupil of the photographic lens L1 and the principle plane of the micro-lens 120 intersect each other. In the example presented in FIG. 3, the geometrical center of the micro-lens 120 matches the pseudo-optical axis of the micro-lens. The cardinal-point pixels 132 b and 132 c are disposed near adjacent micro-lenses 120, whereas the cardinal-point pixel 132 d is disposed on a boundary with an adjacent micro-lens 120. In addition, the micro-lens 120 corresponding to the cardinal-point pixels 132 will be referred to as a cardinal-point micro-lens 121 in the following description.

—Generation of Synthetic Image Signals—

Figure 4A:
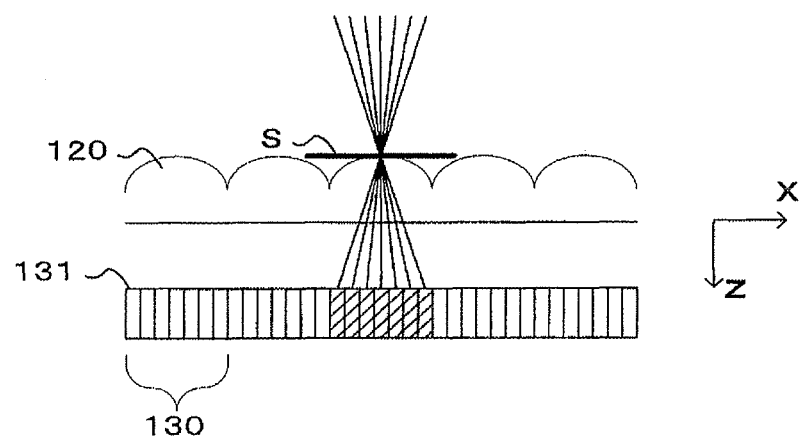
FIGS. 4A and 4B illustrate the principal concept of synthetic image generation, with FIG. 4A illustrating that the focal plane is present at the vertex of the micro-lens and FIG. 4B illustrating that the focal plane is set apart from the vertex of the micro-lens.

First, the synthetic image generation principle applicable to a synthetic image generated when the subject image is formed at the vertex of a micro-lens 120, as shown in FIG. 4A, i.e., when the focal plane S is present at the vertex of the micro-lens 120, is described. In this situation, the light fluxes from the subject enter the image-capturing pixels 131 in the pixel cluster 130 disposed in correspondence to the micro-lens 120. The image integration unit 106 generates a synthetic image signal corresponding to one picture element to be part of the synthetic image data by integrating the image signals output from the shaded image-capturing pixels 131 among the image-capturing pixels 131 in FIG. 4A. The image integration unit 106 generates the synthetic image data by executing this processing for all the pixel clusters 130 each corresponding to one of the micro-lenses 120.

Figure 4B:
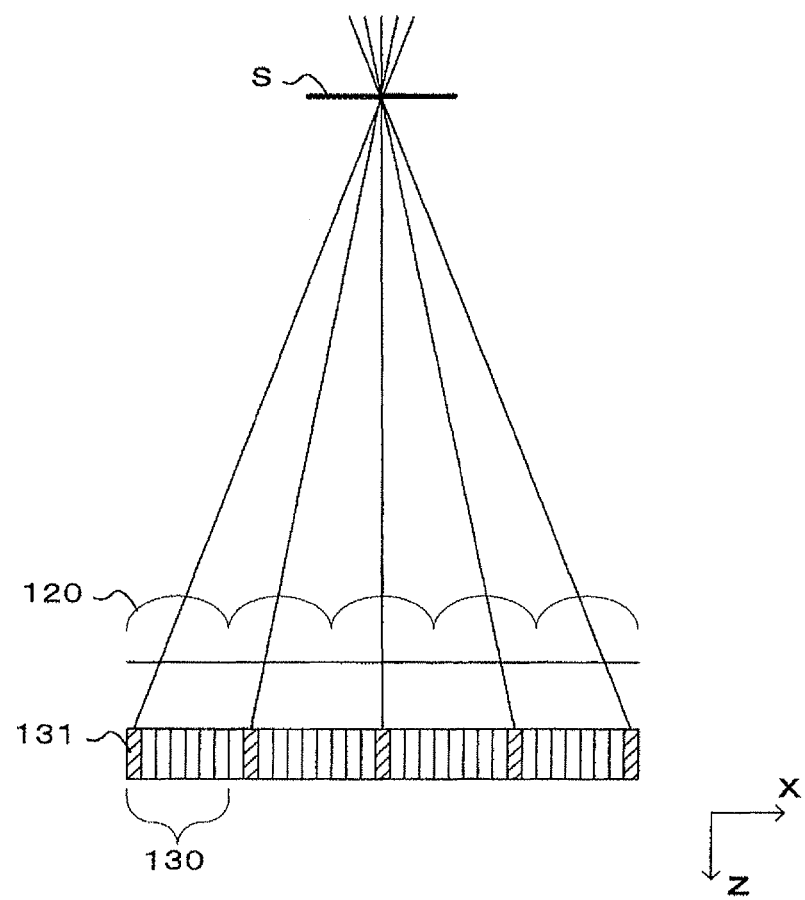

Next, the synthetic image generation principle applicable to a synthetic image signal generated for a subject image formed at a given focal plane (image forming plane) is described. If the focal plane S is set apart from the vertex of the micro-lens 120, light fluxes from the subject enter a plurality of micro-lenses 120 corresponding to different clusters, as shown in FIG. 4(b). For this reason, the image integration unit 106 needs to generate a synthetic image signal by using image signals output from image-capturing pixels 131 disposed in correspondence to micro-lenses 120 near the cardinal-point micro-lens 121, as well. In the embodiment, a plurality of cardinal-point pixels 132 are set in correspondence to each cardinal-point micro-lens 121. In other words, cardinal-point pixels 132, assuming positions other than the position corresponding to the pseudo-optical axis of the micro-lens 120, are included in the cluster.

The image integration unit 106 generates a synthetic image signal equivalent to a single picture element (an image forming area in the synthetic image) to be part of the synthetic image data by integrating all the image signals output from the image-capturing pixels 131 contained in an integration area determined in correspondence to the synthetic image aperture number. It is to be noted that such an integration area is a circular area with a diameter D. The diameter D of the integration area may be expressed as in (1) below, with F representing the aperture number (the synthetic image data aperture number) determined in response to an operation of the aperture number input button 108 a and f representing the focal length of the micro-lenses 120.

$$D=f/F \qquad (1)$$

Figure 5:
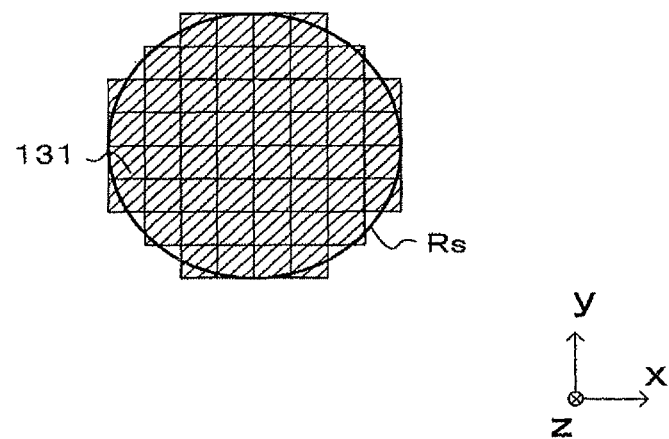
FIG. 5 illustrates the relationship between the integration area over which image signals are integrated for purposes of synthetic image generation and image capturing pixels.

FIG. 5 shows the relationship between the integration area Rs and the image-capturing pixels 131. As described above, the image integration unit 106 integrates the image signals output from all the image-capturing pixels 131 contained in the circular integration area Rs. In FIG. 5, the image-capturing pixels 131 that output image signals to be integrated are shaded. Each micro-lens 120 is just one of numerous lenses constituting the micro-lens array 12. This means that the integration area Rs cannot assume a diameter greater than the diameter that individual micro-lenses 120 may assume within the confines of the array pattern of the micro-lenses 120. Accordingly, the largest aperture number Fmax that can be taken in conjunction with the synthetic image data is expressed as in (2) below. It is to be noted that "s" in expression (2) represents the length of a side of an image-capturing pixel 131. In addition, the smallest aperture number Fmin that can be taken in conjunction with the synthetic image data matches the F number of the micro-lenses 120.

$$F\max=f/s \qquad (2)$$

A synthetic image signal generated by the image integration unit 106 by integrating the image signals output from the pixel cluster 130 that includes the cardinal point pixels 132, i.e., the integral value, is expressed as in (3) below. It is to be noted that P in expression (3) represents the output value indicated in the image signal output from an image-capturing pixel 131. In addition, "i" in expression (3) indicates an image-capturing pixel 131 included in the integration area Rs corresponding to the synthetic image aperture number F and "0" indicates the micro-lens 120 disposed in correspondence to the pixel cluster 130 containing the cardinal-point pixels 132, i.e., the cardinal-point micro-lens 121.

$$P=\Sigma iF \cdot Pi,0 \qquad (3)$$

As described above, the image integration unit 106 executes the integrating operation by using image signals output from image-capturing pixels 131 included in pixel clusters 130 corresponding to micro-lenses 120 disposed near the cardinal-point micro-lens 121, as well. Namely, the image integration unit 106 integrates the output values indicated in the pixel signals from all the image-capturing pixels 131 forming an aggregate F{i} of image-capturing pixels 131 contained in the integration area Rs set in correspondence to the synthetic image aperture number F, which includes the image-capturing pixels 131 set in correspondence to nearby micro-lenses 120 as well as the image-capturing pixels 131 disposed in correspondence to the cardinal-point micro-lens 121. The output value P, which is calculated through this process, is expressed as in (4) below. It is to be noted that "t" in expression (4) represents a nearby micro-lens 120, which may be the cardinal-point micro-lens 121 itself.

$$P=\Sigma iF \cdot Pi,t \qquad (4)$$

Figure 6A:
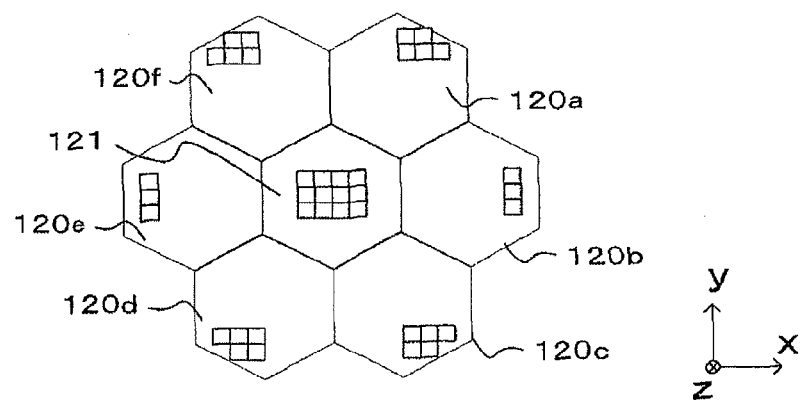
FIGS. 6A and 6B illustrate examples of positional relationships that may be assumed with regard to the positions of the image-capturing pixels that output image signals to be integrated with a cardinal-point signal, with FIG. 6A illustrating the relationship that may be assumed when the focus position of the synthetic image is further toward the subject relative to the micro-lens array and FIG. 6B illustrating the relationship that may be assumed when the focus position of the synthetic image is further toward the image sensor relative to the micro-lens array.
Figure 6B:
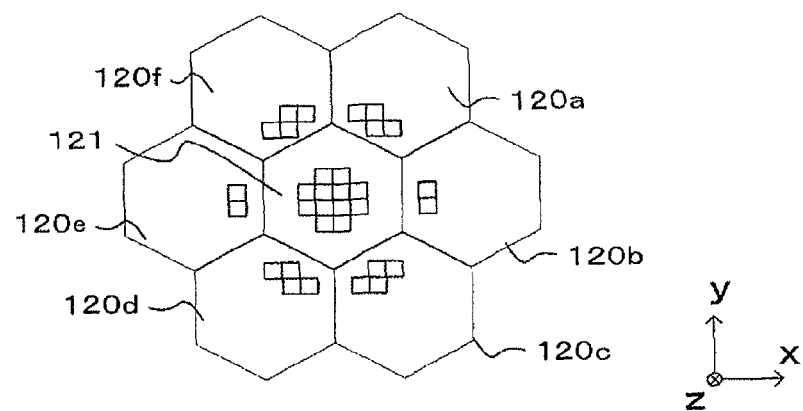

FIGS. 6A and 6B show relationships among the image-capturing pixels 131 that output the image signals used by the image integration unit 106 to generate a single synthetic image signal, the cardinal-point micro-lens 121 and nearby micro-lenses 120 a through 120 f adjacent to the cardinal-point micro-lens 121. It is to be noted that the synthetic image signal is generated in correspondence to the cardinal-point signal output from the cardinal-point pixel 132 a in the examples presented in FIGS. 6A and 6B. The dispersed image-capturing pixels 131, disposed in correspondence to the cardinal-point micro-lens 121 and the adjacent micro-lenses 120 a through 120 f, as shown in FIGS. 6A and 6B, are the plurality of image-capturing pixels 131 contained in the area defined in correspondence to the synthetic image aperture number F, as shown in FIG. 5, i.e., the plurality of image-capturing pixels 131 contained in the integration area Rs.

It is crucial to accurately determine the exact position assumed by each image-capturing pixel 131 that outputs the image signal to be integrated with the cardinal-point signal, in the pixel cluster 130 corresponding to a specific micro-lens 120 when the image integration unit 106 integrates image signals through the processing described above. Accordingly, a synthesis affiliated pixel table indicating how the individual image-capturing pixels 131, each represented by "i" in expressions (3) and (4), are disposed in correspondence to the specific micro-lenses 120 $a$ to 120 $f$, i.e., indicating how the individual image-capturing pixels 131 are dispersed, is stored in a predetermined storage area. The image integration unit 106 generates the synthetic image signal by referencing the synthesis affiliated pixel table. It is to be noted that such a synthesis affiliated pixel table may be expressed as in (5) below.

$$t = Td(i) \qquad (5)$$

The following is a description of the principal based upon which synthesis pixel affiliation tables are created.

Figure 10:
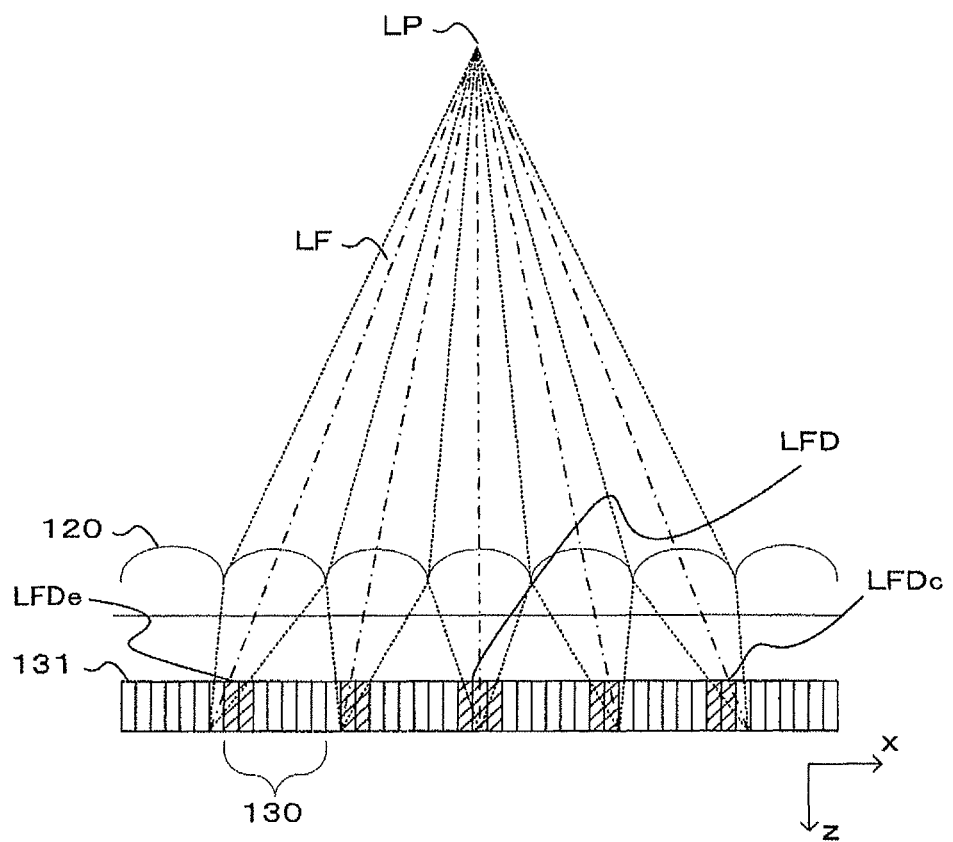
FIG. 10 illustrates light sections of a light flux which, after departing a light point is sliced off at the light-receiving surfaces of image-capturing pixels.

FIG. 10 shows light sections LFD of a light flux that departs a light point LP and travels via the micro-lens array 12 to the light-receiving surfaces of image-capturing pixels 131 where it is sliced off. As shown in FIG. 10, while the light flux LF having departed the light point LP widens, the angle by which it widens is restricted by the image-capturing lens L1 disposed at a preceding stage. For this reason, the light flux LF having entered a given micro-lens 120 is contained within the area covered by the particular micro-lens (although FIG. 10 shows light sections LFDc and LFDe appearing as if they each ranged beyond the area covered by the corresponding micro-lens). This can be substantiated by the fact that the light-receiving surfaces of the image-capturing pixels 131 are set optically conjugate with the pupil of the image-capturing lens L1. When capturing an image via the image-capturing lens L1, a photographic pupil image, i.e., a light boundary, is formed within the area covered by each micro-lens 120 and thus, the light flux LF does not enter the area beyond the area covered by the micro-lens 120.

The following explanation is provided on the premise outlined above. The total quantity of light LF radiated on the micro-lens array 12 shown in FIG. 10, the widening angle of which is restricted by the pupil of the photographic lens L1, in the light flux LF originating from the light point LP, can be calculated by determining the cumulative value of the quantities of light entering image-capturing pixels 131 $a$ through 131 $e$ corresponding to light sections LFDa to LFDe (generically referred to as an LFD) of the light flux LF. Accordingly, the image integration unit 105 obtaining an image signal through integration, needs to determine through arithmetic operation LFD light sections at the light-receiving surfaces of the image-capturing pixels 131 corresponding to the coordinate value assumed by the light point LP along the z-axis. The "light point LP" viewed from the opposite side can be regarded as a convergence point of a light flux LF emitted from display elements each corresponding to a light section LFD of the light flux LF and advancing as if to retrace the path through which the light flux enters the image-capturing pixels as described above.

As explained earlier, the angle indicating the extent by which the light flux LF departing the light point LP widens is determined by the pupil of the photographic lens L1, i.e., by the F number of the image-capturing lens L1. It is to be noted that in a system without an image-capturing lens L1 such as a display system, the maximum aperture (smallest F number) is defined in correspondence to the F number of the micro-lenses 120. Accordingly, the aperture can be restricted simply by utilizing only a central portion of the area covered by each micro-lens 120.

Figure 11:
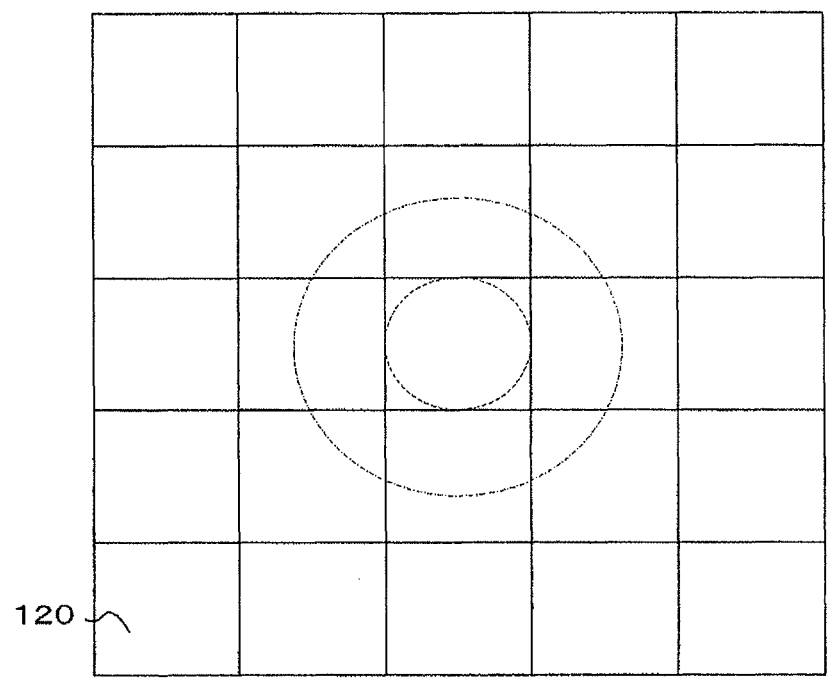
FIG. 11 illustrates relationships between micro-lenses and light sections.

In reference to FIG. 11, showing light fluxes LF originating from light points LP projected onto micro-lenses 120 as widened light fluxes, a specific correspondence between micro-lenses 120 and light sections LFD are described. It is to be noted that FIG. 11 shows micro-lenses 120 disposed in a square grid array so as to facilitate the explanation. In addition, FIG. 11 shows light fluxes LF widening from two different light points LP; a light point LP assuming a position along the z axis that matches the focal length f of the micro-lenses 120 and a light point LP assuming a position along the z-axis matching twice the focal length, i.e., 2f. In FIG. 11, the widened light flux LF departing the light point LP set at the position f is indicated by a dotted line, whereas the widened light flux LF departing the light point LP assuming the position 2f is indicated by a one-point chain line. The extent by which the light flux LF departing the light point LP assuming the position matching the focal length f of a micro-lens 120 widens, is defined by the micro-lens 120 (while the figure shows a circular light section LFD, a light section LFD will take on a square shape if the micro-lens 120 is optically effective through the corners of the square) and thus, the light flux LF enters the single micro-lens 120. The micro-lens 120 corresponding to the particular light point LP is thus determined.

As long as the position of the light point LP matches the focal length f of a micro-lens 120, the light flux LF departing the light point LP widens as a cone of light over the entire area directly under the particular micro-lens 120. Accordingly, the image signals output from all the image-capturing pixels 131 contained in the inscribed circle within the square area should be selected. If the absolute value indicating the position assumed by the light point LP is less than the focal length f, the light flux LF will widen instead of converging within the area directly under the micro-lens 120. However, since the angle by which the incident light flux LF is allowed to widen is restricted, the light section LFD is contained within the area covered by the micro-lens 120.

Figure 12A:
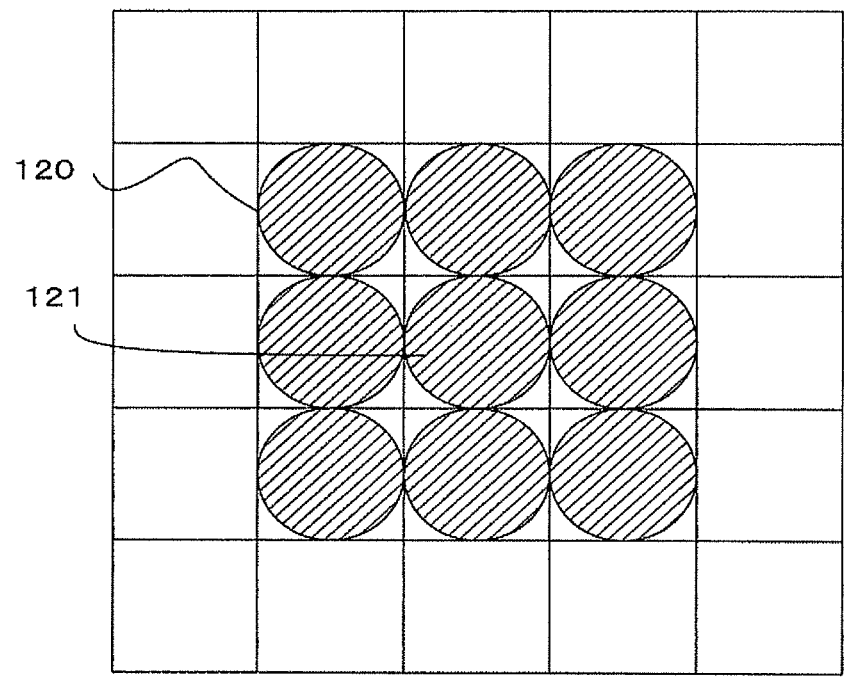
FIGS. 12A and 12B illustrate a relationship between micro-lenses and light sections.
Figure 12B:
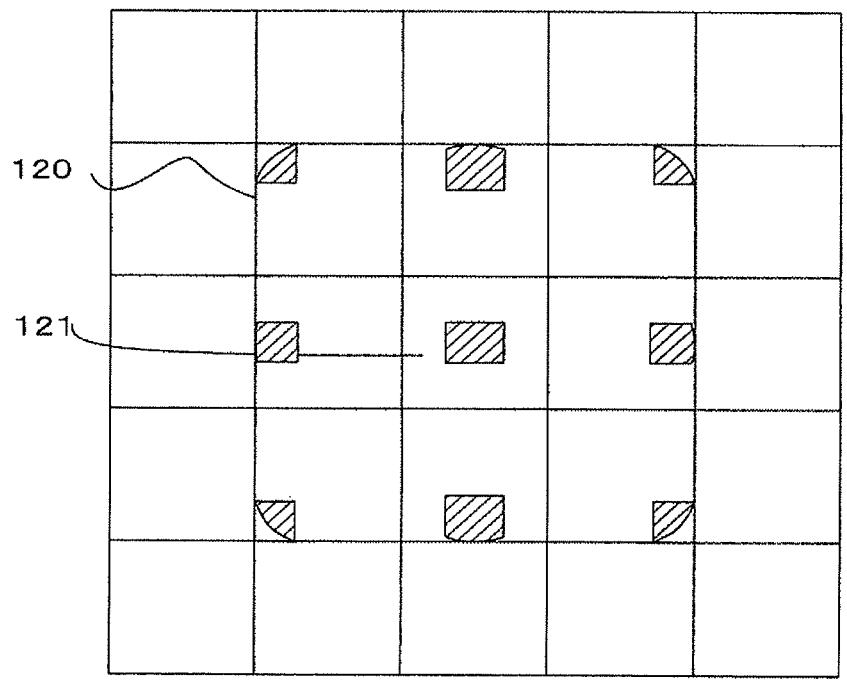

The light flux departing the light point LP assuming the position 2f is described next. FIG. 12 shows the micro-lenses 120 relevant to this light flux. As shown in FIG. 12A, the relevant micro-lenses 120 include the subject micro-lens 120, i.e., the cardinal point micro-lens 121, and the eight micro-lenses 120 surrounding the cardinal point micro-lens 121. Assuming that the opening area is restricted by the individual micro-lenses 120, light sections LFD are bound to be present within the covered areas i.e., the areas covered by the micro-lenses, which are shaded in FIG. 12A. In this situation, the light flux is sliced off over light sections LFD, which are indicated as shaded areas in FIG. 12B at the various micro-lenses 120.

As shown in FIG. 12B, the covered area corresponding to the single cardinal point micro-lens 121 is divided and the divided areas are distributed among the surrounding micro-lenses 120. The whole area achieved by adding up the divided covered areas (partitioned areas) distributed among the neighboring micro-lenses is equivalent to the opening area of a single micro-lens 120. This means that the areal size representing the whole area of the light sections LFD corresponding to a light flux departing a light point LP remains uniform regardless of the position of the light point LP. Accordingly, the total area representing the sum of the partial areas can be calculated by simply determining the specific micro-lens 120 from which the individual partial areas originate.

While FIG. 11 indicates the relationship between the position of the light point LP and the magnification factor, i.e., the quantity of micro-lenses 120 present next to the cardinal point micro-lens 120, this relationship is applicable in a virtual opening area. In the embodiment, the opening area is divided in correspondence to a cluster of micro-lenses 120, reduced based upon the magnification factor, and split pieces of the opening area are set at the corresponding positions within the micro-lenses 120 thus defined. The following description is given on an example in which the square containing opening area is reduced by an extent equivalent to a magnification factor of 2 and the opening area is then divided (area division is applied) in correspondence to the array pattern assumed for the micro-lenses 120.

Figure 13:
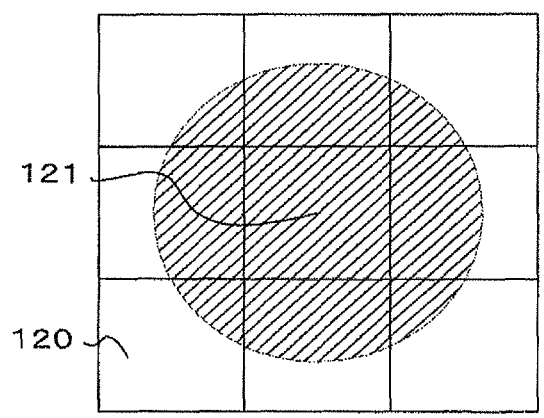
FIG. 13 illustrates light sections resulting from the area division of the area covered by a cardinal point micro-lens.

FIG. 13 shows the light sections LFD resulting from the area division described above are set around the cardinal point micro-lens 121. As the opening area is divided in this manner in correspondence to a specific magnification factor, i.e., a light section LFD pattern corresponding to the specific light point LP, is obtained. In more specific terms, the opening area is divided into a lattice having a width g/m, with "g" representing the diameter of the micro-lenses 120 (the length of each side of a micro-lens). The magnification factor can be expressed as the ratio m=y/f of the height (position) "y" of the light point LP and the focal length f of the micro-lens. The ratio m may take a negative value. When the ratio "m" assumes a negative value, the light point LP may be regarded as being present further toward the image sensor 13 rather than toward the micro-lenses 120.

While it is assumed that the light point LP is present on the pseudo-optical axis along the central axis of a given micro-lens 120 in the description of the example provided above, the calculation described above can be executed without any problem even if the position of the light point LP is offset from the pseudo-optical axis. If the arithmetic operation could not be executed unless the light point LP was set exactly at the center of the lens, the two-dimensional resolution of the synthetic image would be equal to the quantity of the micro-lenses 120, which would prove to be completely inadequate under normal circumstances. For instance, in a configuration in which 100 image-capturing pixels 131 are covered by each micro-lens 120, the resolution of the synthetic image would only be 1/100 of the quantity of the image-capturing pixels. In such a case, 100,000,000 image-capturing pixels 131 would be required in order to generate a synthetic image expressed with 1,000,000 pixels. Accordingly, image synthesis is executed at offset positions as well so as to allow a plurality of light points LP to correspond to a single micro-lens 120.

The product of the area covered by each micro-lens 120 and the quantity of micro-lenses 120 is substantially equal to the total quantity of image-capturing pixels 131 and thus, generating synthetic image data by designating each of a plurality of off-centered points within a given micro-lens 120 as a cardinal point is equivalent to superimposing the image signals from different image-capturing pixels 131. Namely, light fluxes LF having departed the individual off-centered light points LP are superimposed upon one another at each image-capturing pixel 131. However, if the magnification factor is 1, this arithmetic operation will result in simple interpolation, which does not contribute to any improvement in the resolution. This means that when an image is formed near the apex of the micro-lens 120, optical information expressing optical depth will be lost.

Figure 14:
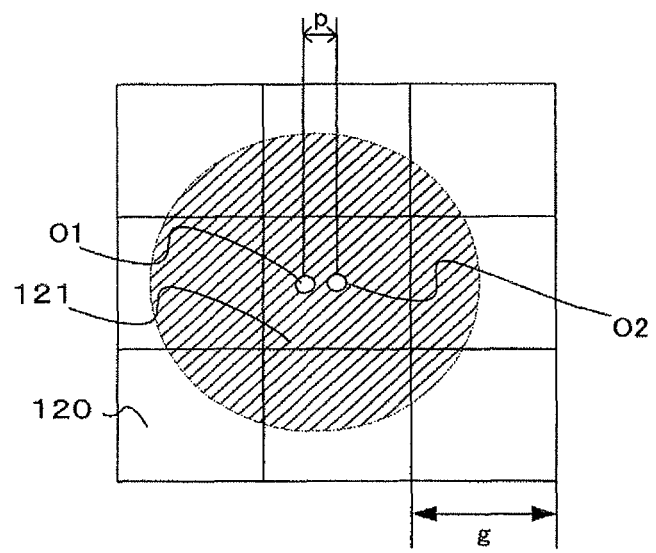
FIG. 14 is an illustration of divided areas formed in correspondence to a light point off-centered relative to the pseudo-optical axis of a cardinal point micro-lens.

FIG. 14 shows divided areas corresponding to a light point LP off-centered to the left relative to the pseudo-optical axis of the cardinal point micro-lens 121. The height (position) of the light point LP, which is offset from the center of the cardinal point micro-lens 121 (with the lens diameter g), i.e., off-centered from the pseudo-optical axis, to the left by an extent p, is 2f. It is to be noted that a point O1 and a point O2 in FIG. 14 respectively indicate the off-centered light point LP and the pseudo-optical axis. In this situation, the divided areas shown in FIG. 14 are defined by shifting the micro-lenses 120 in FIG. 13 to the right by the extent p and then dividing the opening area.

For instance, a micro-lens 120 centered on its pseudo-optical axis set at coordinates (0, 0) may be split into 16 portions with cut-off positions taken at −g/2, −g/4, 0, g/4 and g/2 both along the x-axis and the y-axis. By determining the individual divided areas accordingly and calculating the total of all the divided areas, a group of 16 light points can be obtained in correspondence to the single micro-lens 120.

—Synthesis Affiliated Pixel Table Creation Processing—

The image integration unit 106 references the synthesis affiliated pixel table when it integrates image signals. As described earlier, the synthesis affiliated pixel table makes it possible to ascertain the specific position assumed by each image-capturing pixel 131 that outputs an image signal to be combined with the cardinal-point signal in a pixel cluster 130 which may correspond to the cardinal-point micro-lens 121 or a micro-lens 120 disposed near by the cardinal-point micro-lens 121.

Once the synthetic image focus position y and the synthetic image aperture number F (field depth) are determined, the table creation unit 105 creates a synthesis affiliated pixel table pertaining to the image-capturing pixels 131 that output the image signals to be combined with the cardinal-point signal. As explained earlier, specific image-capturing pixels 131 corresponding to specific micro-lenses 120, the image signals output from which are to be integrated with the cardinal-point signal, are determined in correspondence to the synthetic image focus position.

FIG. 6A shows a relationship that may be assumed when the focus position (focal plane) y of the synthetic image is further toward the subject relative to the micro-lens array 12. FIG. 6B, on the other hand, shows a relationship that may be assumed when the focus position (focal plane) y of the synthetic image is further toward the image sensor 13 relative to the micro-lens array 12. As FIG. 6A and FIG. 6B indicate, among the image-capturing pixels 131 corresponding to the micro-lens 120 a, image-capturing pixels 131 taking up different positions are designated as the image-capturing pixels 131 that output the image signals to be incorporated with the cardinal-point signal in correspondence to the position of the focal plane. Image signals output from the image-capturing pixels taking up different positions are used in the integrating operation in correspondence to the other micro-lenses 120 b through 120 f and the cardinal-point micro-lens 121, as well.

If a plurality of cardinal-point pixels 132 (e.g., the cardinal-point pixels 132 a through 132 d shown in FIG. 3) are present in correspondence to the cardinal-point micro-lens 121, the table creation unit 105 creates a synthesis affiliated pixel table for each of the cardinal-point pixels 132. However, if a plurality of cardinal-point pixels 132 are set in symmetry relative to the pseudo-optical axis of the cardinal-point micro-lens 121, the image integration unit 106 is able to utilize the synthesis affiliated pixel table created for one cardinal-point pixel 132 as the synthesis affiliated pixel table for another cardinal-point pixel 132. For instance, the image integration unit 106 is able to utilize the synthesis affiliated pixel table created for the cardinal-point pixel 132 *b* in FIG. 3 as the synthesis affiliated pixel table for the cardinal-point pixel 132 *d*, which achieves symmetry with the cardinal-point pixel 132 *b* relative to the pseudo-optical axis of the cardinal-point micro-lens 121.

The following is a detailed description of the synthesis affiliated pixel table creation processing executed by the table creation unit 105. The following explanation focuses on the creation processing executed to create the synthesis affiliated pixel table for a typical cardinal-point pixel, i.e., the cardinal-point pixel 132 *a*, which is disposed in correspondence to the pseudo-optical axis of the cardinal-point micro-lens 121. The description is given by assuming that the focal plane of the synthetic image takes a position set apart from the micro-lens array 12 by a distance y, i.e., the focal length is y. In addition, a light flux passing through the pseudo-optical axis of an nth micro-lens 120 taking up the nth position relative to the position of the cardinal-point micro-lens 121 enters at a position set apart by a distance x from the pseudo-optical axis of the cardinal-point micro-lens 121, as expressed in (6) below. It is to be noted that "d" represents the array pitch with which the individual micro-lenses 120 are disposed.

$$x = f n d / y \qquad (6)$$

Considering that the image-capturing pixels 131 each receive a light flux with which an image is formed via the corresponding micro-lens 120, the width L of light included in the subject light from the focus position y of the synthetic image, which is radiated via each micro-lens 120 at the image-capturing plane of the image sensors 13, can be expressed as in (7) below.

$$l = f d / y \qquad (7)$$

The light width l of the light represents a ring-shaped area (hereafter referred to as a zone) assuming a width l on the two-dimensional plane of the image sensor 13. This means that a light flux defined in correspondence to the synthetic image aperture number F enters the area defined by the zone 1 at the micro-lens 120 assuming the nth position counting from the cardinal-point micro-lens 121. As expression (7) indicates, the zone 1 assumes a smaller width as the value representing the synthetic image focus position y increases.

Figure 7:
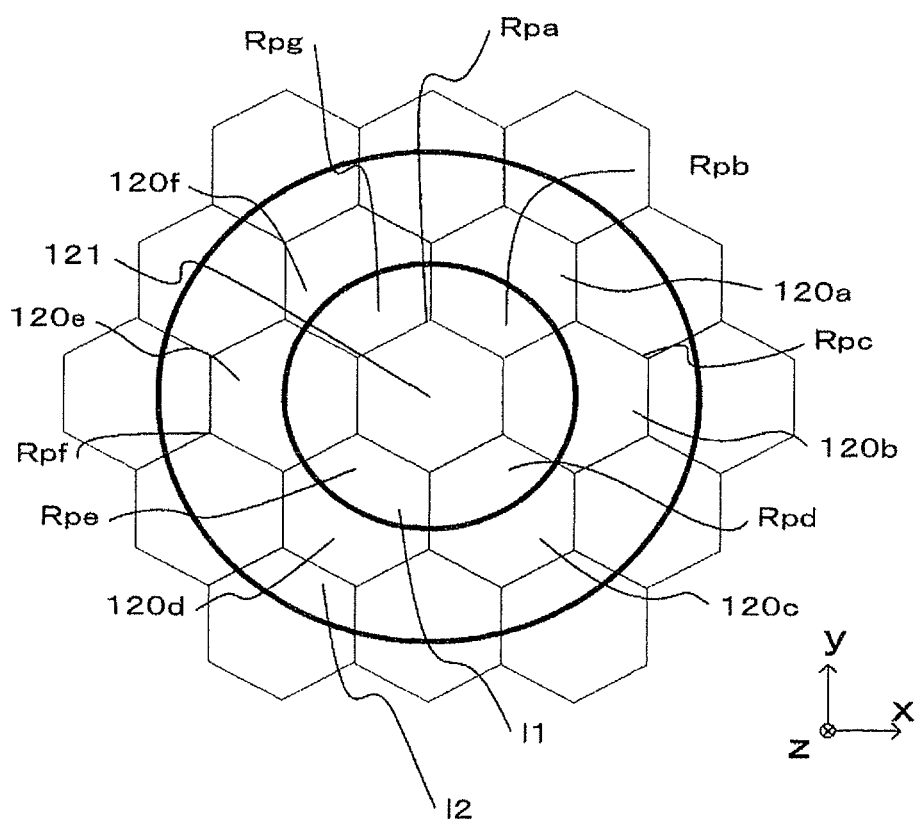
FIG. 7 illustrates an example of a relationship that may be assumed between the zone and the micro-lenses.

As indicated in FIG. 3, the micro-lenses 120 take on a hexagonal shape over the xy plane and the hexagonal micro-lenses are disposed in a honeycomb pattern in the micro-lens array 12 in the embodiment. FIG. 7 shows a zone 11 defined when n=1 and a zone 12 when n=2 in the integration area Rs corresponding to a given synthetic image aperture number F. As FIG. 7 indicates, the zone 11 corresponding to n assuming the value of 1 is partitioned by the cardinal-point micro-lens 121 and the micro-lenses 120 *a* to 120 *f* and thus, partitioned areas Rpa to Rpg are formed. Namely, the individual partitioned areas Rpa to Rpg are covered by different micro-lenses 120. Accordingly, the image integration unit 106 calculates output values Pi, s indicated in the image signals output from the image-capturing pixels 131 contained in the various partitioned areas Rpa to Rpg within the zone 11. The image integration unit 106 then simply needs to integrate the output signals in correspondence to the whole integration area Rs, i.e., all the zones 1.

The relationships of micro-lenses 120 that are adjacent to one another among the cardinal-point micro-lens 121 and the various micro-lenses 120 *a* to 120 *f* are basically similar. Accordingly, the table creation unit 105 determines the specific partitioned area Rp where a given image-capturing pixel 131, among the image-capturing pixels 131 contained in the partitioned areas Rpa to Rpg constituting the zone 11, is present.

Figure 8:
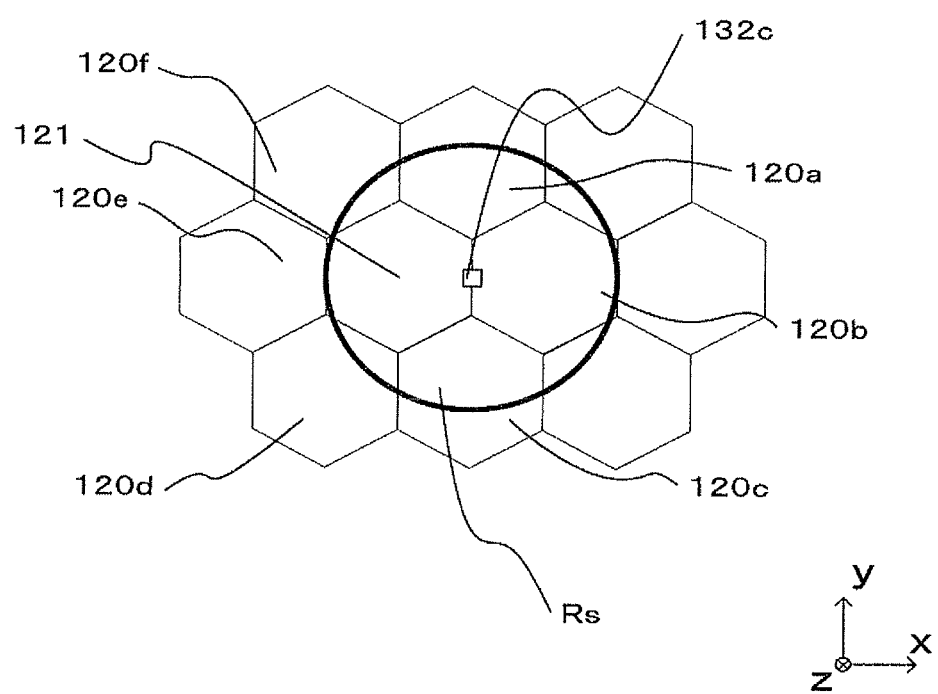
FIG. 8 illustrates an integration area assumed when the cardinal-point pixel is offset from the pseudo-optical axis of the micro-lens.

The diameter of the integration area Rs containing the image-capturing pixels 131 that output the image signals to be integrated with the image signal output from the cardinal-point pixel 132 *a* is expressed as D=f/F. In addition, it is assumed that the array pitch d with which the micro-lenses 120 are disposed along the x-axis (along the horizontal direction), i.e., the diameter of the circle circumscribing each hexagonal micro-lens 120, is equal to the maximum value Dmax that the diameter of the integration area Rs is allowed to take. In addition, the focus position (focal length) assumed for the synthetic image is y relative to the virtual plane of bend of the micro-lenses 120. In this situation, the projected images formed by projecting the individual micro-lenses 120 at the micro-lens array 12 onto the integration area Rs by magnifying their array pitch d by a projection magnification factor of fly, are each equivalent to one of the partition areas Rp defined in the zone 1, as the individual micro-lenses 120 partition it. The table creation unit 105 generates a synthesis affiliated pixel table for the cardinal-point pixel 132 *a*, which indicates the correspondence between the position of an image-capturing pixel 131 contained in each partitioned area Rp to correspondence between the position of an image-capturing pixel 131 contained in each partitioned area Rp and the micro-lens 120 that corresponds to the particular partitioned area Rp. The table creation unit 105 likewise generates synthesis affiliated pixel tables for the other cardinal-point pixels 132 *b* to 132 *d*. It is to be noted that the position of the micro-lens 120 corresponding to a specific partition area Rp is determined as a relative position in reference to the position of the cardinal-point micro-lens 121. It is to be noted that generates a synthesis affiliated pixel table in a similar manner for a cardinal-point pixel 132 that is not disposed on the pseudo-optical axis of the cardinal-point micro-lens 120, i.e., for each of the cardinal-point pixels 132 *b* to 132 *d*, as well. For instance, a cardinal-point pixel such as the cardinal point 132 *c* may be disposed on the boundary of two micro-lenses 120 with an offset from the pseudo-optical axis of the cardinal-point micro-lens 121. In such a case, the table creation unit 105 projects the micro-lenses 120 onto the integration area Rs so as to project them centered around the cardinal-point pixel 132 *c* decentered from the pseudo-optical axis of the cardinal-point micro-lens 121 by either increasing or decreasing the array pitch d of the micro-lenses 120 by an extent matching the projection magnification factor, as shown in FIG. 8.

It is to be noted that there should be a proportional relationship between the positions of the micro-lenses 120 and the image-capturing pixels 131, i.e., between the size of the micro-lenses 120 (array pitch with which the micro-lenses 120 are disposed) and the array pitch of the image-capturing pixels 131. In conjunction with an array pitch set for the image-capturing pixels 131 so that an inner dimension of the micro-lenses 120 is an integral multiple of the array pitch of the image-capturing pixels 131, as shown in FIG. 3, the table creation unit 105 is able to create synthesis affiliated pixel tables by repeatedly executing identical arithmetic operations in correspondence to the individual micro-lenses 120.

The operations executed in the digital camera 1 described above are now explained. As an operation signal is output from the operation unit 108 in response to a shutter release switch operation by the user, the control circuit 101 engages the image sensor 13 so as to start capturing a subject image and the image sensor outputs the resulting image signals. The image signals output from the image sensor 13 are converted to digital image signals at the A/D conversion circuit 102 and the digital image signals are stored into the memory 103. The image integration unit 106 generates synthetic image data by using the image signals stored in the memory 103.

Once the control circuit 101 determines the synthetic image aperture number F and the synthetic image focus position y in response to operations of the aperture number input button 108 *a* and the focus position input button 108 *b* performed by the user, the table creation unit 105 creates synthesis affiliated pixel tables, as has been described earlier. Since the integration area Rs is determined in correspondence to the synthetic image aperture number F, the table creation unit 105 calculates the projection magnification factor based upon the synthetic image focus position y having been determined and then defines the partitioned areas Rp within the integration area Rs. The table creation unit 105 creates a synthesis affiliated pixel table based upon the image-capturing pixels 131 contained in the partitioned area Rp having been defined and then stores the synthesis affiliated pixel table into a predetermined storage area.

The image integration unit 106 executes synthetic image data generation processing for the image signals stored in the memory 103 by using the synthesis affiliated pixel tables thus stored in the storage area. At this time, the image integration unit 106 may execute the synthetic image data generation processing by generating synthetic image signals for one pixel cluster 130 at a time among the pixel clusters 130, each corresponding to a specific micro-lens 120, or it may generate the synthetic image data by sequentially generating synthetic image signals in the order matching the order with which the individual cardinal-point pixels 132 are disposed.

More specifically, the image integration unit 106 selects a cardinal-point micro-lens 121 among the micro-lenses 120 and determines the integration area Rs centered on the pseudo-optical axis of the cardinal-point micro-lens 121. As explained earlier, the term "pseudo-optical axis" is used in the description of the embodiment to refer to the point at which the center of a light flux entering from the pupil of the photographic lens L1 and the principal plane of the micro-lens 120 intersect each other. Under normal circumstances, the pseudo-optical axis of a micro-lens 120 present further toward the periphery of the micro-lens array 12, i.e., a micro lens 120 disposed in correspondence to a position at which the subject image assumes a greater height, manifests a greater extent of offset relative to the geometrical center of the micro-lens 120. Accordingly, in conjunction with the photographic lens L1 with the pupil thereof set at a fixed position, the micro-lenses 120 should be designed so as to achieve a proportional relationship between the individual image-capturing pixels 131 at the image sensor 13 and the pseudo-optical axis of the micro-lens 120.

If the image-capturing pixels 131 do not have a proportional relationship to the pseudo-optical axes of the corresponding micro-lenses 120, the table creation unit 105 needs to create synthesis affiliated pixel tables through standardization by interpolating the positions of image-capturing pixels 131 in correspondence to each micro-lens 120 in reference to the pseudo-optical axis of the micro-lens. Such standardization may be achieved by adopting, for instance, the bicubic method or the nearest-neighbor method of the known art.

The synthesis affiliated pixel tables are created by the table creation unit 105 based upon the positions of image-capturing pixels 131, which are standardized as described above. Accordingly, the image integration unit 106 is able to generate synthetic image data in reference to such a synthesis affiliated pixel table by integrating the image signals output from image-capturing pixels 131 present within the integration area Rs, which is determined based upon the synthetic image aperture number F. The synthetic image data having been generated by the image integration unit 106 then undergo standardization processing at the image standardization unit 107. The pitch of the synthetic image data having been generated by the image integration unit 106 is determined based upon the proportional relationship between the array pattern of the micro-lenses 120 and the array pattern of the image-capturing pixels 131, and thus, the picture elements constituting the synthetic image data assume different pitch values along the horizontal direction and the vertical direction. When the micro-lenses 120, assuming a hexagonal shape, are disposed in a honeycomb array and four cardinal-point pixels 132 are disposed in each pixel cluster 130, as shown in FIG. 3, the ratio of the horizontal pitch and the vertical pitch is calculated as expressed in (8) below.

$$1\square:\square 0.8660 \approx 1\square:\square 3/2 \tag{8}$$

Accordingly, the image standardization unit 107 executes standardization through interpolation operation executed along the vertical direction or the horizontal direction by adopting, for instance, the nearest-neighbor method or the bicubic method of the known art. As a result, the ratio of the horizontal pitch of the synthetic image data to the vertical pitch of the synthetic image data is modified to 1:1 via the image standardization unit 107.

The following advantages are achieved with the digital camera 1 in the embodiment described above.

(1) A plurality of micro-lenses 120 are disposed in a two-dimensional array near the focal plane of the photographic lens L1 and the image sensor 13 includes a two-dimensional array of pixel clusters 130 and each made up with a plurality of image-capturing pixels 131 disposed in correspondence to one of the micro-lenses 120. The image-capturing pixels 131 in the pixel clusters 130 receive, via the micro-lenses 120, light fluxes from the subject, having passed through the photographic lens L1, and output image signals. The image integration unit 106 generates synthetic image signals corresponding to a plurality of image forming areas at a given focus position, i.e., on a given image forming plane assumed for the photographic lens L1, by combining image signals output from specific image-capturing pixels 131 based upon a synthesis affiliated pixel table indicating the specific positions of the image-capturing pixels 131 that output image signals used for purposes of generating a synthetic image signal in each image forming area. The table creation unit 105 creates synthesis affiliated pixel tables in correspondence to each focus position.

In the related art, a synthetic image signal equivalent to one picture elements among the picture elements constituting synthetic image data on a given focal plane is generated by combining image signals output in correspondence to the light fluxes having passed through a coordinate point that corresponds to the central position assumed by the micro-lens 120. Namely, the number of picture elements constituting the synthetic image data, i.e., the resolution of the synthetic image data matches the number of micro-lenses 120 set in the array. For instance, assuming that the diameter of each micro-lens 120 is equal to ten image-capturing pixels 131 set side-by-side, i.e., assuming that 10×10 image-capturing pixels 131 are arrayed together in correspondence to each micro-lens 120, the image density of the image expressed with the synthetic image data generated in the camera 1 will be ¹⁄₁₀₀, since the number of picture elements constituting the synthetic image data is equal to the number of micro-lenses 120 disposed in the array. In other words, even if 10,000,000 image-capturing pixels 131 are arrayed at the image sensor 13, synthetic image data expressed with only 100,000 picture elements will be generated.

The digital camera 1 achieved in the embodiment is distinguishable from those in the related art in that four cardinal-point pixels 132, in correspondence to each of which a synthetic image signal equivalent to one pixel element in the synthetic image data is generated, are disposed in correspondence to a single micro-lens 120. As a result, better resolution is assured over that of synthetic image data generated in a digital camera adopting the technologies of the related art. In other words, a higher level of resolution than that matching the number of micro-lenses 120 in the array is achieved, which makes it possible to provide a synthetic image of better quality (2) The table creation unit 105 creates a synthesis affiliated pixel table indicating the positions of the image-capturing pixels 131 that output image signals to be combined with the cardinal-point signal output from a cardinal-point pixel 132. This means that synthetic image data can be generated without having to execute complicated arithmetic operations involving the Fourier transform, which the technologies in the related art require. Consequently, even when the micro-lenses 120 are not disposed in a rectangular array (e.g., even when the micro-lenses 120 are disposed in a honeycomb array) on the xy plane and thus the arithmetic operations involving the Fourier transform would be particularly complicated, the synthetic image can be generated at high speed while assuring a lighter processing load by adopting the present invention. Furthermore, since the table creation unit 105 creates synthesis affiliated pixel tables each time a specific synthetic image focus position y is selected, there is no need to store in advance an extremely large number of tables each in correspondence to a specific cardinal-point pixel 132 among a plurality of cardinal-point pixels 132 at a specific synthetic image focus position y among a plurality of synthetic image focus positions and thus, the memory space can be utilized sparingly.

(3) The positional interval with which the plurality of cardinal-point pixels 132 are disposed has a proportional relation to the array pitch with which the plurality of micro-lenses 120 are disposed. In other words, the array pitch for the image-capturing pixels 131 is determined so that the value representing the size of the micro-lenses 120 is an integral multiple of the array pitch assumed for the image-capturing pixels 131. As a result, the image integration unit 106 is able to generate synthetic image data for a cardinal-point pixel 132 corresponding to a given micro-lens 120 by executing processing identical to the synthetic image generation processing executed for a cardinal-point pixel 132 corresponding to another micro lens 120 among the plurality of micro-lenses 120. Synthetic image data can thus be generated at high speed by lessening the load of the synthetic image generation processing.

(4) The table creation unit 105 creates a synthesis affiliated pixel table in correspondence to each of the plurality of cardinal-point pixels 132 *a* to 132 *d*. Such a synthesis affiliated pixel table indicates the positions of the image-capturing pixels 131 corresponding to the cardinal-point pixel 132, which are standardized in reference to the pseudo-optical axis of the micro-lens 120. In addition, the synthesis affiliated pixel table specifies the relative position of the micro-lenses 120 corresponding to the positions at which the image-capturing pixels 131 are disposed in reference to the position of the cardinal-point micro-lens 121. Consequently, the image integration unit 106 is able to select the image-capturing pixels 131 that output the image signals to be combined with the cardinal point image signal provided from the cardinal-point pixel 132 simply by referencing the synthesis affiliated pixel table, thereby achieving faster synthetic image data generation processing.

(5) The synthesis affiliated pixel tables created by the table creation unit 105 each indicate the correspondence of the position of an image-capturing pixel 131 contained in the integration area Rs set around a cardinal pixel 132 designated as a cardinal point and assuming a diameter D (=f/F) equal to the value obtained by dividing the focal length f of the micro-lenses 120 by the synthetic image aperture number F, to a specific micro-lens 120 among the plurality of micro-lenses 120. As a result, the image integration unit 106 is able to select the image signals to be combined with the cardinal-point signal provided from the cardinal-point pixel 132, i.e., the image signals corresponding to the synthetic image aperture number F, simply by referencing the synthesis affiliated pixel table, assuring faster synthetic image data generation processing.

(6) The image standardization unit 107 standardizes the synthetic image data generated by the image integration unit 106 so as to modify the ratio of the horizontal pitch and the vertical pitch of the synthetic image data to 1. Thus, even when the micro-lenses 120 assume a shape other than a rectangle over the xy plane, synthetic image data with matching horizontal and vertical pitches are generated so as to provide a synthetic image with the highest possible image quality.

The digital camera 1 achieved in the embodiment as described above, allows for the following variations.

Figure 9A:
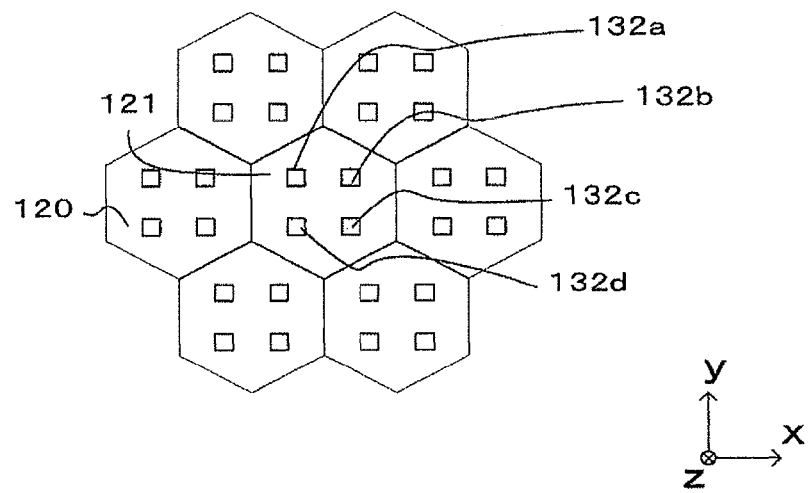
FIGS. 9A and 9B illustrate variations in micro-lens shapes and cardinal-point pixel positions.

(1) The four cardinal-point pixels 132 *a* to 132 *d* disposed in correspondence to each micro-lens 120 may assume positions decentered from the pseudo-optical axis of the micro-lens 120. FIG. 9A presents an example of positions that may be taken by such cardinal pixels 132. The cardinal-point pixels 132 *a* to 132 *d* in this example are disposed at positions so as to assume symmetry to one another relative to the pseudo-optical axis of the micro-lens 120. The image integration unit 106 is thus able to utilize the synthesis affiliated pixel table created in correspondence to a cardinal-point pixel 132 among the cardinal-point pixels 132 disposed as shown in FIG. 9A in conjunction with the other three cardinal-point pixels 132, as well. For instance, the image integration unit 106 may utilize the synthesis affiliated pixel table created in correspondence to the cardinal-point pixel 132 *a* as a synthesis affiliated pixel table for the cardinal-point pixel 132 *b* by rotating the initial synthesis affiliated pixel table by 60°, then as a synthesis affiliated pixel table for the cardinal-point pixel 132 *e* by further rotating the synthesis affiliated pixel table by 60° and as a synthesis affiliated pixel table for the cardinal-point pixel 132 *d* by rotating the synthesis affiliated pixel table by another 60°. In other words, the table creation unit 105 simply needs to create a single synthesis affiliated pixel table in correspondence to each micro-lens 120.

Figure 9B:
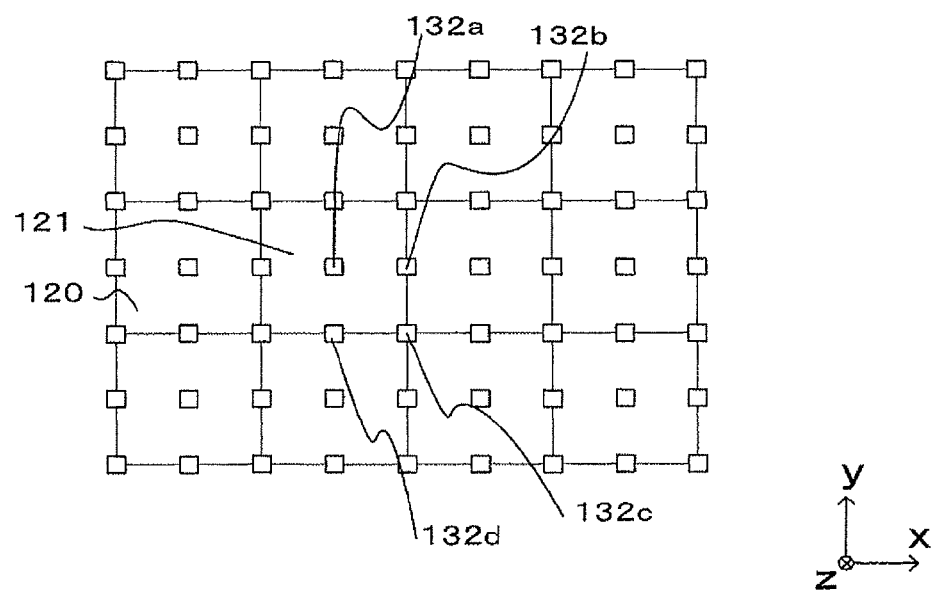

(2) The present invention may be adopted in conjunction with, for instance, square micro-lenses 120 disposed in a rectangular array, instead of the micro-lenses 120 assuming a hexagonal shape and disposed in a honeycomb array over the xy plane. FIG. 9B presents an example of a positional arrangement that may be adopted in conjunction with such square micro-lenses 120 and the corresponding cardinal-point pixels 132. In this case, too, the table creation unit 105 will create synthesis affiliated pixel tables each corresponding to one of the four cardinal-point pixels 132 *a* to 132 *d* through a method similar to that described in reference to the embodiment and then the image integration unit 106 will generate synthetic image data by referencing the synthesis affiliated pixel tables. However, unlike the synthetic image data generated in conjunction with the micro-lenses 120 disposed in the honeycomb array, the synthetic image data generated in conjunction with the square micro-lenses will achieve a ratio of 1:1 for the horizontal data pitch and the vertical data pitch, thereby eliminating the need for any standardization processing by the image standardization unit 107.

(3) While synthesis affiliated pixel tables are created in the embodiment each in correspondence to one of the four cardinal-point pixels 132, the present invention is not limited to this example and n (n represents an integer equal to or greater than 1) synthesis affiliated pixel tables may be created in correspondence to each micro-lens. For instance, if the pixel cluster 130 corresponding to the cardinal-point micro-lens 120 includes 16 cardinal-point pixels 132, i.e., when generating synthetic image data with a resolution 16 times the array pitch of the micro-lenses 120, the table creation unit 106 will need to create 16 different synthesis affiliated pixel tables. It is to be noted that if a single cardinal-point pixel 132 is disposed in correspondence to the cardinal-point micro-lens 121, the resolution of the synthetic image data will match the number of micro-lenses 120 disposed in the micro-lens array.

As long as the features characterizing the present invention are not compromised, the present invention is not limited to the particulars of the embodiments described above and other modes that are conceivable within the technical scope of the present invention will also be within the scope of present invention. The embodiment and the variations described above may be adopted in any combination.

What is claimed is:

1. An image processing apparatus, comprising:
an image generating unit, executed by a processor, that generates, from output data of a first receive unit and a second receive unit, and from output data of a third receive unit and a fourth receive unit among a plurality of receive units that is disposed at each of a plurality of micro-lenses and outputs the output data to generate an image on an arbitrary focal plane, the image on the focal plane that is constituted with more pixels than the plurality of micro-lenses, the first receive unit being disposed at a predetermined micro-lens and used regardless of the focal plane of the image to be generated, the second receive unit being disposed near at the predetermined micro-lens and changed in accordance with change of the focal plane of the image to be generated, the third receive unit being different from the first receive unit, disposed at the predetermined micro-lens and used regardless of the focal plane of the image to be generated, and the fourth receive unit being disposed near at the predetermined micro-lens and changed in accordance with change of the focal plane of the image to be generated,
wherein the first receive unit, the second receive unit, the third receive unit, an the fourth receive unit each comprises image-capturing pixels.

2. The image processing apparatus according to claim 1, wherein:
the image generating unit generates the image on the focal plane constituted with more pixels than a plurality of micro-lenses from the output data of the first receive unit, the second receive unit and a fifth receive unit that is disposed at the predetermined micro-lens and changed in accordance with change of the focal plane of the image to be generated, and the output data of the third receive unit, the fourth receive unit and a sixth receive unit that is disposed at the predetermined micro-lens and changed in accordance with change of the focal plane of the image to be generated,
wherein the fifth receive unit and the sixth receive unit each comprises image-capturing pixels.

3. The image generating apparatus according to claim 2, further comprising:
an information creation unit, executed by a processor, that creates information regarding positions of the first receive unit, the second receive unit, the third receive unit, the fourth receive unit, the fifth receive unit and the sixth receive unit.

4. The image generating apparatus according to claim 2, further comprising:
a memory that stores information regarding positions of the first receive unit, the second receive unit, the third receive unit, the fourth receive unit, the fifth receive unit and the sixth receive unit.

5. The image processing apparatus according to claim 1, further comprising:
an information creation unit, executed by a processor, that creates information regarding positions of the first receive unit, the second receive unit, the third receive unit and the fourth receive unit.

6. The image generating apparatus according to claim 1, further comprising:
a memory that stores information regarding positions of the first receive unit, the second receive unit, the third receive unit and the fourth receive unit.

7. An image-capturing device, comprising:
a plurality of micro-lenses;
an image sensor that includes a plurality of receive units that is disposed at each of the plurality of micro-lenses and receives subject light via the micro-lens; and
an image generating unit, executed by a processor, that generates, from output data of an first receive unit and a second receive unit, and from output data of a third receive unit and a fourth receive unit among a plurality of receive units that is disposed at each of a plurality of micro-lenses and outputs the output data to generate an image on an arbitrary focal plane, the image on the focal plane that is constituted with more pixels than the plurality of micro-lenses, the first receive unit being disposed at a predetermined micro-lens and used regardless of the focal plane of the image to be generated, the second receive unit being disposed near at the predetermined micro-lens and changed in accordance with change of the focal plane of the image to be generated, the third receive unit being different from the first receive unit, disposed at the predetermined micro-lens and used regardless of the focal plane of the image to be generated, and the fourth receive unit being disposed near at the predetermined micro-lens and changed in accordance with change of the focal plane of the image to be generated, wherein the first receive unit, the second receive unit, the third receive unit, and the fourth receive unit each comprising image-capturing pixels.

8. The image-capturing device according to claim 7, wherein:
the image generating unit generates the image on the focal plane constituted with more pixels than a plurality of micro-lenses from the output data of the first receive unit, the second receive unit and a fifth receive unit that is disposed at the predetermined micro-lens and changed in accordance with change of the focal plane of the image to be generated, and the output data of the third receive unit, the fourth receive unit and a sixth receive unit that is disposed at the predetermined micro-lens and changed in accordance with change of the focal plane of the image to be generated,
wherein the fifth receive unit and the sixth unit each comprises image-capturing pixels.

9. The image generating apparatus according to claim 8, further comprising:
an information creation unit, executed by a processor, that creates information regarding positions of the first receive unit, the second receive unit, the third receive unit, the fourth receive unit, the fifth receive unit and the sixth receive unit.

10. The image generating apparatus according to claim 8, further comprising:
a memory that stores information regarding positions of the first receive unit, the second receive unit, the third receive unit, the fourth receive unit, the fifth receive unit and the sixth receive unit.

11. The image-capturing device according to claim 7, further comprising:
an information creation unit, executed by a processor, that creates information regarding positions of the first receive unit, the second receive unit, the third receive unit and the fourth receive unit.

12. The image-capturing device according to claim 7, further comprising:
a memory that stores information regarding positions of the first receive unit, the second receive unit, the third receive unit and the fourth receive unit.

13. An image-capturing device, comprising:
a plurality of micro-lenses disposed in a two-dimensional pattern near a focal plane of an image forming optical system;
an image sensor that includes a two-dimensional array of pixel groups each corresponding to one of the micro-lenses and made up with a plurality of imaging pixels which receive, via the micro-lenses light fluxes from a subject having passed through the photographic optical system and output image signals;
a cardinal-point pixel setting unit, executed by a processor, that sets a plurality of cardinal-point pixels from among the plurality of imaging pixels of the pixel group for each micro-lenses;
an image forming plane setting unit, executed by a processor, that sets a predetermined image forming plane of the photographic optical system;
a table creation unit, executed by a processor, that creates a table for each cardinal-point pixels based on the set predetermined image forming plane, the table specifying positions of corresponded imaging pixels corresponding to the cardinal-point pixel in the pixel group including the cardinal-point pixel and in neighbor pixel group disposed near at the pixel group including the cardinal-point pixel;
a synthesized image signal generating unit, executed by a processor, that synthesizes the image signal of the cardinal-point pixel, the image signals of the corresponded image pixels in the pixel group including the cardinal-point pixel and the image signals of the corresponded image pixels in the neighbor pixel group, based on the table, and generates synthesized image signal on the set predetermined image forming plane for each cardinal-point pixels; and
a synthesized image data generating unit, executed by a processor, that generates synthesized image data on the set predetermined image forming plane based on the synthesized image signal for each of the cardinal-point pixels.

* * * * *